United States Patent [19]

Ohtaka et al.

[11] Patent Number: 4,698,492
[45] Date of Patent: Oct. 6, 1987

[54] FOCUS DETECTOR SYSTEM WITH A DISTORTION COMPENSATION MASK

[75] Inventors: Keiji Ohtaka, Tokyo; Akira Hiramatsu, Yokohama; Yasuo Suda, Yokohama; Akira Akashi, Yokohama; Akira Ishizaki, Yokohama, all of Japan

[73] Assignee: Canon Kabushiki Kaisha, Tokyo, Japan

[21] Appl. No.: 749,383

[22] Filed: Jun. 27, 1985

[30] Foreign Application Priority Data

Jul. 2, 1984 [JP] Japan ................................ 59-137020

[51] Int. Cl.⁴ ....................... G03B 13/28; G01J 1/20
[52] U.S. Cl. .................................. 250/201; 250/204; 354/407
[58] Field of Search ...................... 354/406, 407, 408; 250/201 PF, 204

[56] References Cited

U.S. PATENT DOCUMENTS

| | | | |
|---|---|---|---|
| 4,497,561 | 2/1985 | Suzuki | 354/406 |
| 4,544,255 | 10/1985 | Utagawa | 354/406 |
| 4,547,663 | 10/1985 | Kitagishi et al. | 354/406 |
| 4,560,863 | 12/1985 | Matsumura et al. | 354/407 |
| 4,567,362 | 1/1986 | Kunz | 250/201 |

*Primary Examiner*—David C. Nelms
*Assistant Examiner*—Charles Wieland
*Attorney, Agent, or Firm*—Fitzpatrick, Cella, Harper & Scinto

[57] ABSTRACT

A focus detection system includes an object lens for focusing an image of an object, a refocusing optical system for refocusing a plurality of component image having parallax from the image of the image, a view field mask arranged between the object lens and the refocusing optical system and having a laterally extending aperture, and a sensing device having a photo-sensor array for sensing the component images. Focus detection error is prevented by determining a sense area of the photo-sensor array in accordance with a distortion created in an aperture image by the refocusing optical system.

4 Claims, 7 Drawing Figures

FOCUS DETECTOR SYSTEM WITH A DISTORTION COMPENSATION MASK

BACKGROUND OF THE INVENTION

1. Field of the Invention

The present invention relates to a focus detection system for a camera or the like, and more particularly to a focus detection system which detects a focus position of an object lens by the relative positional relation of a plurality of secondary object images formed by light fluxes passing through a plurality of areas in a pupil of the object lens of the camera.

2. Description of the Prior Art

A focus detection system which uses a refocusing system arranged on an image plane side of a focusing lens to detect a focus state of the focusing lens by detecting a relative positional relation of a plurality of secondary object images formed from a primary object image which is formed by the focusing lens based on light fluxes from a plurality of areas in a pupil of the focusing lens, has been proposed such as by Japanees Patent Application Laid-Open No. 95221/1977. FIG. 1 shows a prior art optical system for the focus detection systems which uses the refocusing system. A problem encountered in this system is discussed below.

Numeral 1 denotes a focusing lens which corresponds to an object lens of a camera, numeral 2 denotes a view field mask arranged on or near a predetermined focusing plane of the object lens 1, numeral 4 denotes a pupil division prism including two prisms 4a and 4b having opposite angles of inclination, numeral 4' denotes a pupil division mask, numeral 5 denotes a refocusing lens having the pupil division mask 4' as a pupil thereof, and numeral 6 denotes a field lens arranged near the predetermined focusing plane of the object lens 1 for focusing the pupil of the refocusing lens 5 near the pupil of the object lens 1. The pupil division prism 4, pupil division mask 4', refocusing lens 5 and the field lens 6 constitute a refocusing system. Numeral 7 denotes photo-electric conversion means having two photo-electric conversion device arrays 7a and 7b arranged near the image plane of the refocusing system in correspondence to the two prisms 4a and 4b.

The pupil of the object lens 1 is divided into two pupil areas 8a and 8b by the refocusing system. A light flux passed through the pupil area 8a forms a primary object image near the view field mask 2 and then forms a secondary object image having a parallax near the photo-electric conversion device array 7a by the refocusing lens 5 through the field lens 6 and the prism 4a. A light flux passed through the pupil area 8b of the object lens 1 also forms a primary object image near the view field mask 2 and then forms a secondary object image near the photo-electric conversion device array 7b by the refocusing lens 5 through the prism 4b. Since a relative position of those two secondary object images varies with a focus status of the object lens 1, the focus status of the object lens 1 can be detected by detecting the relative position of two secondary object images.

If for example, the focusing plane of the object lens 1 is on the predetermined focusing plane, the relative position of the two secondary object images respectively coincides with reference positions, but if the focusing plane of the focusing lens 1 is in front of the predetermined focusing plane, that is, in a near-focus state, the two secondary object images are shifted from the reference position in directions of arrows 9a and 9b, respectively. If the focusing plane of the object lens is behind the predetermined focusing plane, that is, in a far-focus state, the secondary object images are shifted in directions of arrows 10a and 10b, respectively.

In the focus detection system shown in FIG. 1, the pupil division prism 4 plays an important role to divide the pupil of the object lens 1 but it creates a unique distortion in the secondary object image by a prism function.

For example, when a square grid pattern 12 shown in FIG. 2 is viewed through a prism 13, an image 11' being distorted relative to an ideal image 11 shown in FIG. 3 appears. Even if aberrations of the refocusing lens 5 are compensated for, the distortion still appears in the secondary object image.

When the images of the view field mask 2 on the photo-electric conversion device arrays 7a and 7b in the focus detection system 1 of FIG. 1 are viewed from the image plane side, they appear as shown in FIG. 4. The aperture images 14a and 14b of the view field mask 2 include arcuate distortions created by the prisms 4a and 4b. Those distortions cause the reduction of focus detection accuracy. This is explained in connection with FIG. 5.

It is assumed in FIG. 5 that the object has a dark and light edge pattern and boundaries of dark and light edges are inclined with respect to the direction of the photo-electric conversion device arrays 7a and 7b. It is also assumed that the focusing lens 1 is in an in-focus state to the object and secondary object images are focused around the photo-electric conversion device arrays 7a and 7b. Numerals 15 and 16 respectively denote a light area and a dark area of the secondary object images of the edge pattern.

Since the object lens 1 is in the in-focus state, the two secondary object images are formed at essentially same positions with respect to those of the distored aperture images 14a and 14b of the view mask and the border lines of the dark and light areas of the secondary object images coincide with positions 17 and 18 at which the secondary object images cross the aperture images 14a and 14b of the view field mask.

However, the position at which the photoelectric conversion device arrays 7a and 7b cross the dark-light border lines are positions 19 and 20 for the upper image shown in FIG. 5 and positions 19' and 20' for the lower image shown in FIG. 5. Accordingly, the two secondarly object images are laterally spaced by distances d and d', respectively.

As a result, the signals from the photoelectric conversion device arrays 7a and 7b indicating that two secondary object images respectively deviated from the reference positions are produced. Consequently, an out-of-focus state is detected although the focusing lens 1 is inthe in-focus state.

Such an error is created not only when the object has an oblique edge pattern but also when the object has a dark-light distribution which is normal to direction of the photo-electric conversion device array.

SUMMARY OF THE INVENTION

It is an object of the present invention to prevent reduction of detection accuracy of a focus detecting system due to detection error for a secondary object image.

It is another object of the present invention to compensate for distortion of an image due to a secondary object image forming optical system.

It is other object of the present invention to provide a photo-sensitive area adpted to an image distortion due to a pupil division prism of a secondary object image forming optical system.

Other objects of the present invention will be apparent from the following description.

BRIEF DESCRIPTION OF THE PREFERRED EMBODIMENTS

Figure 1:
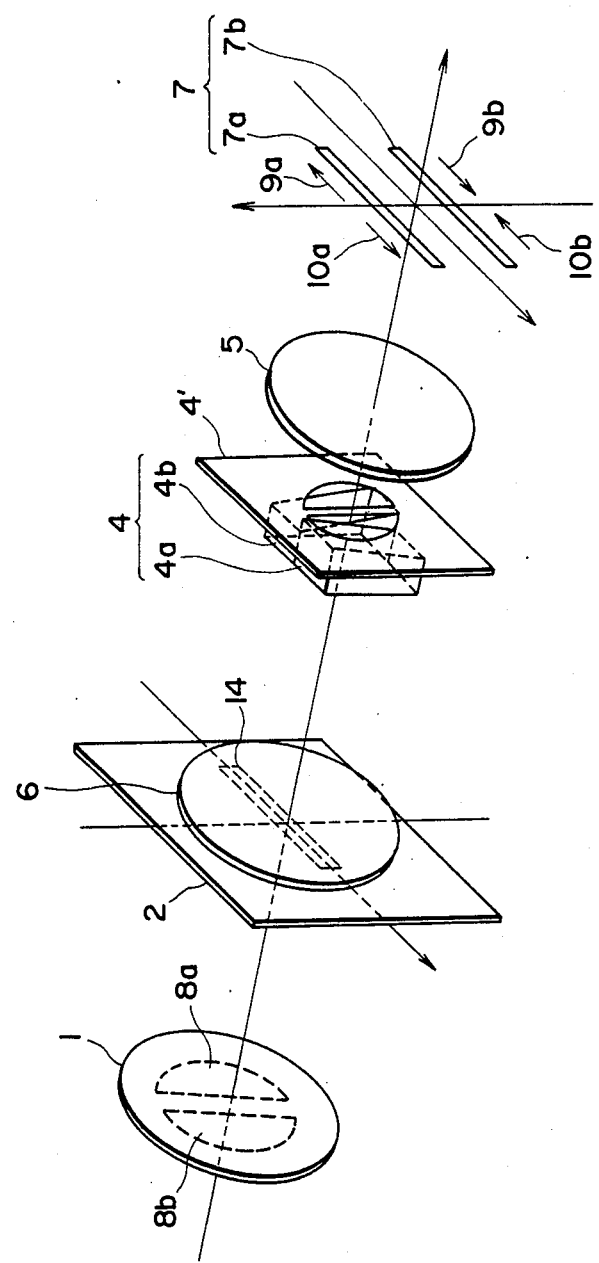
FIG. 1 is a perspective view of a prior art focus detection system.
Figure 2:
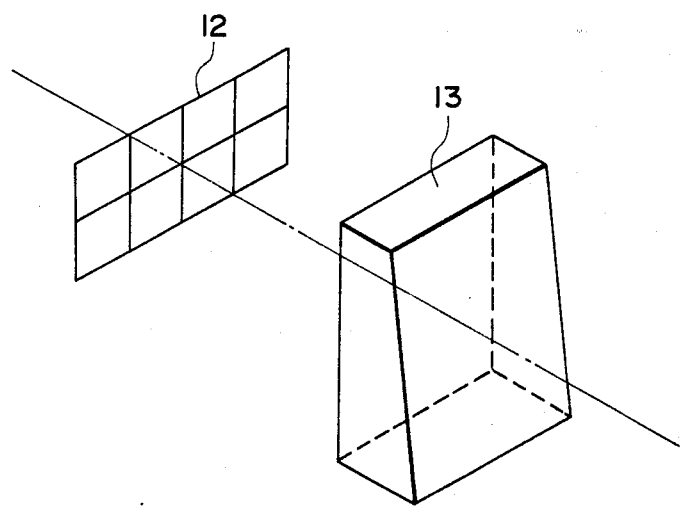
FIG. 2 is a perspective view illustrating an optical function of a prism.
Figure 3:
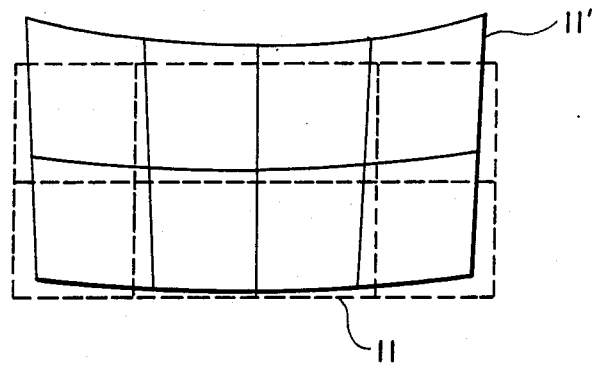
FIG. 3 shows a distored image by a prism.
Figure 4:
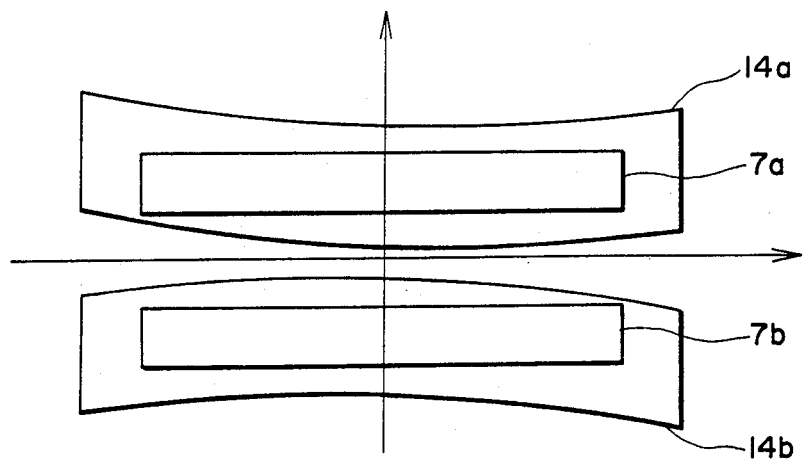
FIG. 4 shows a relationship between a photosensor array and a view field mask.
Figure 5:
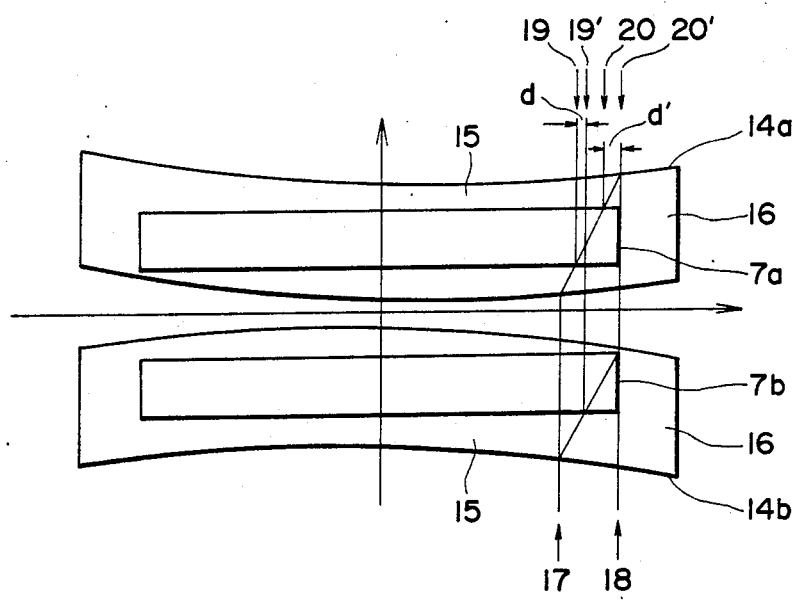
FIG. 5 illustrates a mechanism of detection error.
Figure 6:
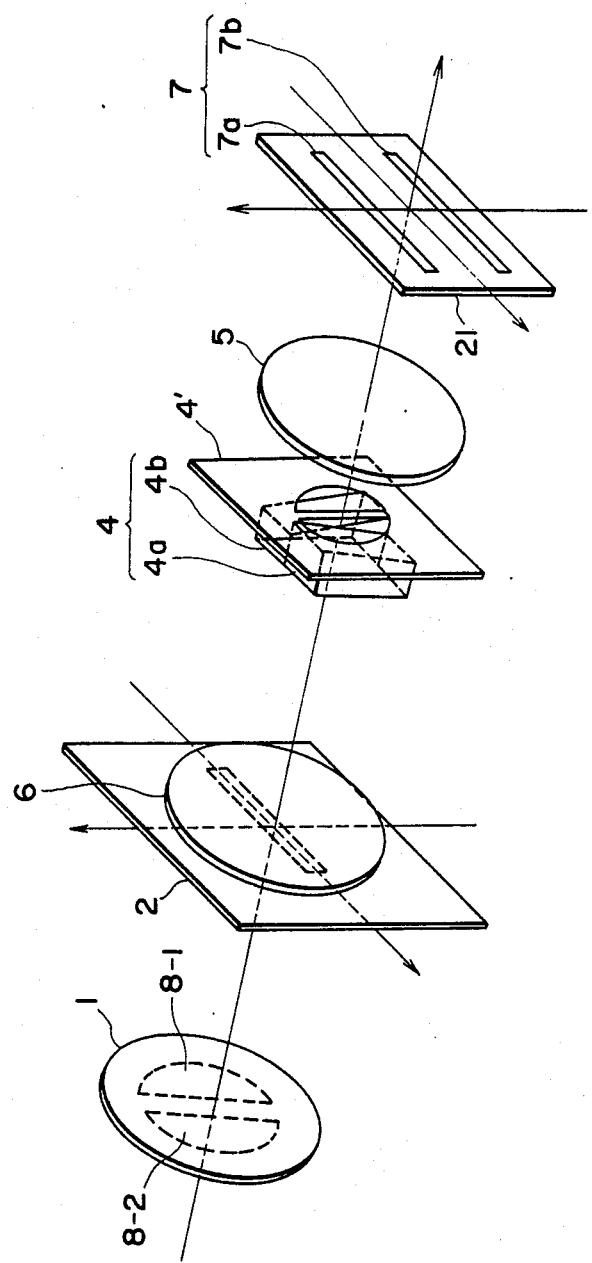
FIG. 6 is an optical perspective view of an embodiment of the present invention.

FIG. 6 shows an embodiment of the present invention, in whic the like elements to those shown in FIG. 1 are designated by like numerals. Numeral 21 denotes a compensation mask arranged in front of the photo-electric conversion device arrays 7a and 7b to compensate for distortion of the secondary object image created by the pupil division prism 4. The aperture is omitted is FIG. 6.

Assuming that the focusing lens is in the in-focus position, the relationships among the compensation mask 21, photo-electric conversion device arrays 7a and 7b and the aperture images 14a and 14b of the view field mask are explained with reference to FIG. 7. Numerals 21a and 21b denote light-transmissive arcuate apertures formed in the compensation mask 21. The apertures 21a and 21b are distorted arcuately to follow the distortions of the images 14a and 14b of the view field mask. They are sized such that they are witin the areas of the images 14a and 14b of the view field mask. the light fluxes of the edge patterns of the images 14a and 14b of the view field mask which pass throug the inside of the apertures 21a and 21b are sensed by the photo-electric conversion device arrays 7a and 7b. Those are positions 22 and 23. An upper aperture image 14a and a lower aperture image 14b coincide.

Figure 7:
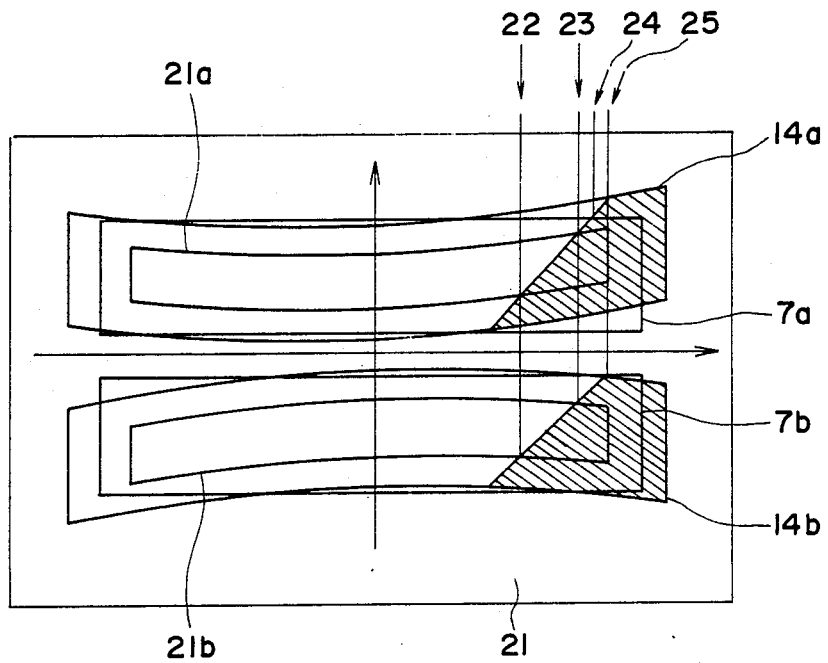
FIG. 7 illustrates an effect of compensation of an image distortion.

Accordingly, in FIG. 7, the object lens 1 is determined to be in the in focus state. This is also true when the object has a brilliance distribution normal to the photo-electric conversion device arrays.

If the apertures 21a and 21b of the present embodiment are not arranged in front of the photoelectric conversion device arrays 7a and 7b, the areas sensed by the photo-electric conversion device arrays 7a and 7b are at the position 24 for the upper image 14a and at the position 25 for the lower image 14b, and those positions do not coincide.

Accordingly, the object lens is determined to be in the out-of-focus state although it is in the infocus state. In the present embodiment, by virture of the compensation mask 21, the affect of the distortions of the aperture images 14a and 14b of the view field mask due to the pupil division means are eliminated and the error in the focus detection is prevented.

In the present embodiment, the apertures 21a and 21b may be of any size so long as they are included in the areas of the photo-electric conversion device arrays 7a and 7b. The compensation mask may contact the photoelectric conversion means of be slightly spaced therefrom.

In the present embodiment, the pupil of the focusing lens is divided into two areas. The pupil may be divided into more than two areas by adding a corresponding number of pupil division prisms and photo-electric conversion device arrays which are arranged so that the light fluxes passing through the pupil are selectively used in accordance with an F-number of the object lens. Thus, the accuracy of the focus detection is further improved.

In accordance with the present invention, the effect of the distortion of the secondary object image due to the pupil division means is eliminated and a high accuracy focus detection system is provided.

We claim:

1. A focus detection system comprising:
   object optical means for forming an image of an object;
   refocusing means for relaying a light flux from said object optical means and forming a plurality of component images having parallax;
   light restriction means arranged between said object optical means and said refocusing means and having an aperture;
   sensing means having a photo-sensor array for sensing said component images; and
   mask means for determining a shape of a photo-sensing area of said photo-sensor array in accordance with a distortion created in a long side of an aperture image by said refocusing means, said mask means having an aperture of a distorted long side for masking said photo-sensor array.

2. A focus detection system according to claim 1 wherein said refocusing means includes a biprism.

3. A focus detection system according to claim 2 wherein said refocusing means includes a focusing lens.

4. A focus detection system comprising:
   object optical means for forming an image of an object;
   refocusing means for relaying a light flux from said object optical means and forming a plurality of component images having parallax;
   light restriction means arranged between said object optical means and said refocusing means and having an aperture;
   sensing means having photo-sensor arrays arranged in parallel with one another for sensing said component images, each of said photo-sensor arrays having a photo-sensing area of a predetermined shape; and
   mask means for determining the shape of a photo-sensing area of said photo-sensor array in accordance with distortion created in a long side of an aperture image by said refocusing means, said mask means having an aperture of a distorted long side for masking said photo-sensor array.

* * * * *

UNITED STATES PATENT AND TRADEMARK OFFICE
CERTIFICATE OF CORRECTION

PATENT NO. : 4,698,492

DATED : October 6, 1987

INVENTOR(S) : K. OHTAKA, ET AL.

It is certified that error appears in the above-identified patent and that said Letters Patent is hereby corrected as shown below:

AT [57] IN THE ABSTRACT

Line 3, "image" should read --images--.

COLUMN 1

Line 22, "Japanees" should read --Japanese--.
    Line 25, "systems" should read --system--.

COLUMN 2

Line 33, "16 respectively" should read --16, respectively--.
    Line 38, "distored" should read --distorted--.
    Lines 49-50, "secon-/darly" should read --secondary--.
    Line 57, "inthe" should read --in the--.

UNITED STATES PATENT AND TRADEMARK OFFICE
CERTIFICATE OF CORRECTION

PATENT NO. : 4,698,492

DATED : October 6, 1987

INVENTOR(S) : K. OHTAKA, ET AL.

Page 2 of 2

It is certified that error appears in the above-identified patent and that said Letters Patent is hereby corrected as shown below:

COLUMN 3

Line 4, "other" should read --another--.
    Line 5, "adpted" should read --adapted--.
    Line 15, "prism." should read --prism,--.
    Line 16, "distored" should read --distorted--.
    Line 28, "whic" should read --which--.
    Line 33, "is" (second occurrence) should read --in--.
    Line 44, "witin" should read --within--.
    Line 45, "the" (second occurrence) should read --The--.
    Line 47, "throug" should read --through--.
    Line 53, "in focus" should read --in-focus--.
    Line 64, "infocus" should read --in-focus--.
    Line 66, "affect" should read --effect--.

COLUMN 4, line 8, "of" should read -- or --.

Signed and Sealed this

Seventh Day of June, 1988

Attest:

DONALD J. QUIGG

Attesting Officer

Commissioner of Patents and Trademarks